July 18, 1939.	R. S. HALL ET AL	2,166,567
SAW-FILING APPARATUS
Filed Feb. 17, 1936

INVENTORS
ROBERT SVEN HALL
ROY DENHARD
BY Whittemore Hulbert Whittemore
& Belknap ATTORNEYS Patented July 18, 1939

2,166,567

UNITED STATES PATENT OFFICE 2,166,567

SAW-FILING APPARATUS

Robert Sven Hall and Roy Denhard,
Detroit, Mich.

Application February 17, 1936, Serial No. 64,395

7 Claims. (Cl. 76—36)

The invention relates to apparatus for facilitating the sharpening of saws and more particularly handsaws and the like.

The primary object of the invention is to obtain a relatively simple and inexpensive device by means of which the saw teeth may be filed to the proper angle and proper depth, and be uniformly spaced. To this end the construction consists in the structure hereinafter more fully described and illustrated in the accompanying drawing, wherein Figure 1 is a plan view of the saw filing device;

Figure 1:
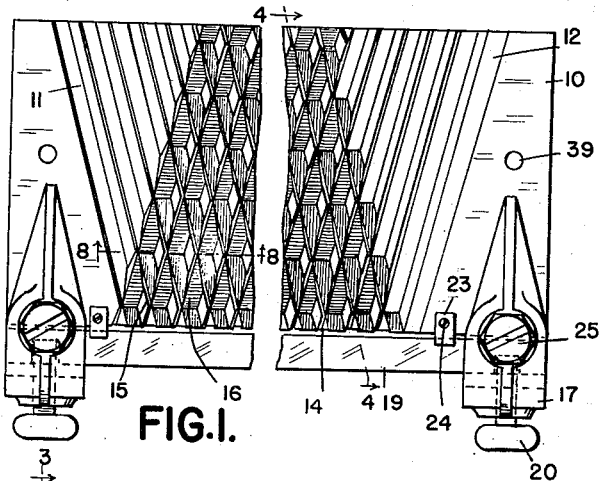
Figure 2:
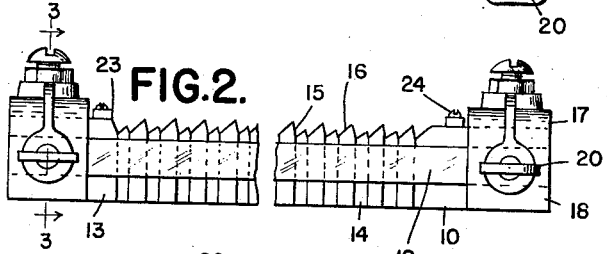
Figure 2 is a side elevation.
Figure 4:
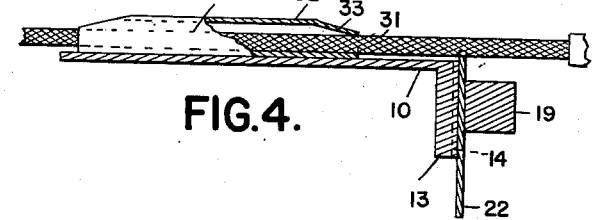
Figure 4 is a cross section on the line 4—4 of Figure 1 showing the file in position.
Figure 7:
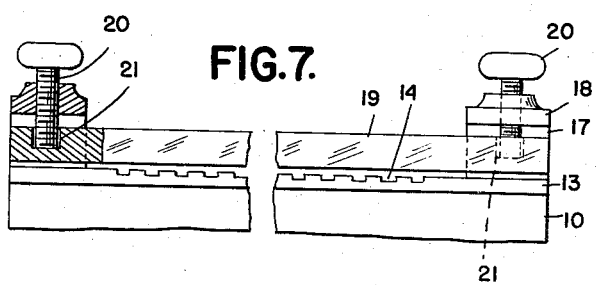
Figure 7 is a bottom plan view of the saw filing rig.
Figure 8:
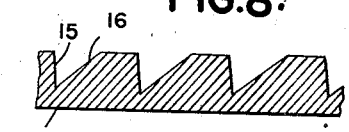
Figure 8 is a vertical section on the line 8—8, which is normal to the direction of the groove in the plate 10.

In the construction illustrated in Figure 1, the saw filing rig comprises a base plate 10 of substantial width, on the surface of which are arranged a series of parallel inclined grooves 11 extending in one direction and another series of grooves 12 inclined in the opposite direction. The inclination of these grooves is such as to correspond with the angle of the cutting edges of the saw teeth which it is desired to sharpen. The plate is preferably manufactured as a die casting with the grooves formed in the casting, but of course the grooves may be formed by machining operations if so desired. The plate 10 has the downwardly turned flange 13 having a series of vertical slots 14 therein through which the filings from the saw may pass. As shown in Figure 8, the side faces of the grooves 11 are at different inclinations, the left hand face 15 being but slightly inclined and the right hand face 16 being more greatly inclined to the vertical. This corresponds with the angle on the teeth of the saw.

The length of the plate 10 may be any convenient length to accommodate a certain number of the teeth of the saw and is preferably not too great, in order that the device may be easily carried. At the ends of the plate are extension pieces 17 having downwardly turned flanges 18. A clamping bar 19 is held in position adjacent the front edge of the plate by means of the adjusting screws 20 which enter into recesses 21 in the clamping bar. Preferably the clamping bar is slightly bowed so as to engage in its midportion first, so that when sufficient tension for clamping is placed on the same by means of the clamping screws 20, an even contact of the saw 22 will be obtained for the entire length of the clamping face.

Figure 9:
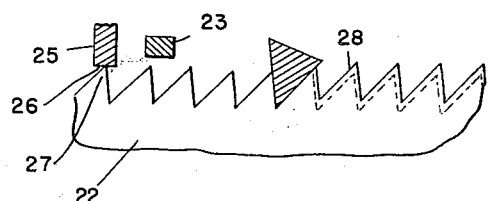
Figure 9 is a diagram illustrating the adjustment of the saw after one portion of the teeth of the same have been filed.
Figure 3:
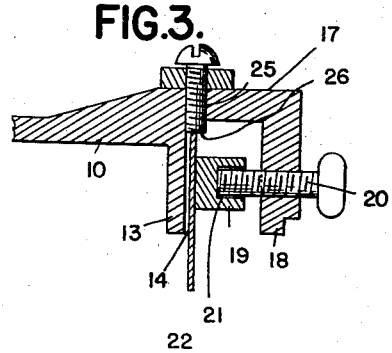
Figure 3 is a cross section on the line 3—3 of Figure 2 with the saw in position.

In order to adjust the saw to the desired height, there are provided the stops 23 which are adjustably secured to the plate 10 by means of screws 24. The stops project over the edge of the plate so that the teeth of the saw may be brought up into contact with the same before clamping in the fixture. On the left hand extension piece there is also provided an adjustable stop 25 which is preferably set so that its lower face 26 is slightly lower than the operative face of the stop 23. Thus when the saw is moved to the left to bring a new series of teeth into registration with the grooves 11 and 12, the teeth 27 which have previously been filed and are therefore somewhat lower than the unfiled teeth 28, may bear against the stop 25 instead of the stop 23. This is illustrated in Figure 9. Thus the stop 23 is used for determining the height of the saw before any teeth have been filed and the stop 25 is thereafter used. The difference between the heights of the stops 23 and 25 must be that amount of metal removed during the sharpening of the saw. When the saw is moved to bring the new series of teeth into registration, one or two of the previously filed teeth are kept in alignment with the grooves in the plate so that the unfiled teeth will be properly registered with the grooves to maintain uniform spacing. To accomplish this alignment the file is held in one of the grooves and the saw is placed so that the file comes between two of the finished teeth and at the same time the saw is held against the stops previously mentioned. When the position of the saw has thus been accurately determined, the saw is clamped in position with the clamping bar and another series of teeth can then be filed.

As previously stated, the guiding plate 10 is of substantial width so that the file may have sufficient bearing to maintain the desired angle while permitting a substantial reciprocating stroke. In order to prevent the file from wearing the sides of the grooves 11 and 12, it is preferable to provide a guiding clip 29 having smooth sides. The length of this clip is sufficient to insure that the file maintains the proper angle.

Figure 5:
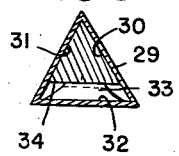
Figure 5 is a cross section through one form of file guiding clip.
Figure 6:
Figure 6 is a cross section through a modified form of clip.
Figure 10:
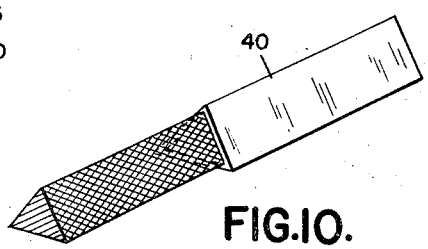
Figure 10 is a fragmentary perspective view illustrating a file with the guiding means integral therewith.

One form of clip is shown in Figure 5. In this construction the clip is triangular and firmly fits against the angle 30 of the file 31, while the opposite face 32 is spaced from the file. At the ends of the clip there are inturned faces 33 which engage against the face 34 of the file, thus holding the clip in firm engagement with the file. This form of clip is removable and may be placed on any standard form of triangular file. Another form of guiding clip is shown in Figure 6. In this form the sides 35 of the triangular clip are pressed inwardly to engage the small end of the file 36, thus causing each of the edges of the clip to be in proper angular relation with the edges of the file. It should also be understood that if desired a special file may be made up having an enlarged triangular portion 40 free from the filing teeth as shown in Figure 10. In each of the cases hereinbefore described, the file teeth do not come in contact with the grooves in the saw filing rig and therefore there is no wear upon the same.

The construction hereinbefore described is useful for the sharpening of saws because it insures that all of the teeth of the saw will be uniformly filed to the same height and to the same angle. The grooves in the plate are for the purpose of spacing, and at the same time guiding the file, and also to cause the file to stay in the correct angle to give the saw tooth the proper rake and to hold the file at the proper angle across the saw to give the tooth a fine point for fast cutting. The grooves are arranged so that the teeth in the saw are finished on both sides, front and back, throughout the length of the saw filing rig without moving the saw. The saw filer as previously described has shown the grooves 11 extending at an angle corresponding to the angle of the cutting teeth in a crosscut saw. It should be understood, however, that where the saw filer is designed for the sharpening of ripsaws the grooves in the plate will be at right angles to the edge of the plate against which the saw is clamped.

The triangular shaped tube or guiding clip is of extreme importance, for it keeps the file from coming in direct contact with the grooves which, if made of soft metal, would soon be mutilated and filed out of shape, or if made of hardened metal, would ruin the file. The grooves are long enough to give the file the required stroke and still give the protecting sleeve its full length in the groove to hold the file in position. The front face of the fixture is beveled on its upper edge to make room for the teeth which are set towards this face. It should also be noted that the fixture is provided with holes 39 on opposite sides of the plate 10 to permit the saw filing rig to be fastened to a bench or table with wood screws.

What we claim as our invention is:

1. A saw filer comprising a plate having a face and a transverse edge, the face of the plate having a series of grooves therein arranged to correspond to the teeth of the saw, a pair of stops overhanging said transverse edge for engaging unfiled teeth to locate the same at the proper height, and a stop adjacent one of the first-mentioned stops and having a different height to engage the filed teeth when the unfiled teeth are at the correct height.

2. A saw filer comprising a guide plate of substantial width having a series of guiding grooves of sufficient length to give a substantial guiding action, means for clamping a saw against one edge of said plate, and adjustable stops adjacent the saw engaging edge of said plate, said stops being respectively high and low stops so as to serve as saw positioning means when engaging the tops of unfiled and filed teeth respectively.

3. A saw filer comprising a plate having a face and a transverse edge, the face of the plate having a series of grooves therein for a reciprocating file, means carried by said plate adjacent said transverse edge for engaging unfiled teeth of a saw to locate the latter at the proper height, and means adjacent the first mentioned means and having a different height to engage the filed teeth when the unfiled teeth are at the correct height.

4. A saw filer comprising a guide plate, means for clamping a saw against a portion of said plate, and adjustable stops adjacent said clamping means, said stops being respectively high and low stops so as to serve as saw-positioning means when engaging the tops of unfiled and filed teeth respectively.

5. A saw filer having a base of relatively large area provided in its upper surface with file-receiving grooves and provided at an edge thereof with a depending flange having slots therein through which filings from a saw may pass, and means cooperating with said depending flange for holding a saw to be filed.

6. A saw filer having a base provided at an edge thereof with means for clamping a saw, and two independently operable means for adjusting a saw vertically relative to said clamping means, one of said means being engageable with the unfiled teeth of a saw, and the other of said means being at a different elevation and engageable with the filed teeth of the saw.

7. A saw filer having a base provided at an edge thereof with means for clamping a saw, means for adjusting a saw vertically relative to said clamping means including a horizontal stop adjustably secured to the base, and a vertical stop carried by said base and engageable with the unfiled teeth of a saw, the lower end of said vertical stop normally being lower than the operative face of the horizontal stop and engageable with the filed teeth of the saw.

ROBERT SVEN HALL.
ROY DENHARD.